(12) United States Patent
Yamada et al.

(10) Patent No.: US 11,023,750 B2
(45) Date of Patent: Jun. 1, 2021

(54) VIDEO OUTPUT SYSTEM

(71) Applicant: Hitachi Automotive Systems, Ltd., Hitachinaka (JP)

(72) Inventors: Tetsuya Yamada, Tokyo (JP); Koichi Yokoura, Hitachinaka (JP); Toshiyuki Innami, Hitachinaka (JP); Haruki Matono, Hitachinaka (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 164 days.

(21) Appl. No.: 16/327,010

(22) PCT Filed: Apr. 6, 2017

(86) PCT No.: PCT/JP2017/014368
§ 371 (c)(1),
(2) Date: Feb. 21, 2019

(87) PCT Pub. No.: WO2018/047393
PCT Pub. Date: Mar. 15, 2018

(65) Prior Publication Data
US 2019/0180123 A1 Jun. 13, 2019

(30) Foreign Application Priority Data
Sep. 12, 2016 (JP) .............................. JP2016-177322

(51) Int. Cl.
*G06K 9/00* (2006.01)
*H04N 7/18* (2006.01)
*G08G 1/00* (2006.01)

(52) U.S. Cl.
CPC ..... *G06K 9/00805* (2013.01); *G06K 9/00771* (2013.01); *G06K 9/00825* (2013.01);
(Continued)

(58) Field of Classification Search
CPC ........... G06K 9/00805; G06K 9/00771; G06K 9/00825; H04N 7/183; H04N 7/18; G08G 1/00
(Continued)

(56) References Cited

U.S. PATENT DOCUMENTS 9,299,260 B2  3/2016 Sobue et al.
9,589,194 B2  3/2017 Oshida et al.
(Continued)

FOREIGN PATENT DOCUMENTS

CN  103843326 A  6/2014
CN  104885448 A  9/2015
(Continued)

OTHER PUBLICATIONS

Extended European Search Report issued in European Application No. 17848340.0 dated Apr. 17, 2020 (nine pages).
(Continued)

*Primary Examiner* — Ayodeji O Ayotunde
(74) *Attorney, Agent, or Firm* — Crowell & Moring LLP

(57) ABSTRACT

A video output system provided with a camera and an interface device, wherein the interface device is provided with a condition storage unit which specifies conditions under which a video is to be selected by the camera, and a video output unit which outputs a captured video received from the camera, and wherein the camera is provided with: an image sensor; a video generation unit which generates captured videos on the basis of the output of the image sensor; a condition acquisition unit which acquires said conditions from the interface device; a recognition/comparison unit which determines whether or not each captured video generated by the video generation unit meets the acquired conditions, and if it is determined that a captured video meets the conditions, generates identification infor-
(Continued)

mation on the basis of recognition results of a subject to be recognized that is included in the captured image determined to meet the conditions, and that is associated with the conditions; and a camera calculation unit which outputs, to the interface device, at least each captured video determined by the recognition/comparison unit as meeting the conditions, from among the captured videos generated by the video generation unit, and the identification information associated with that captured video.

10 Claims, 13 Drawing Sheets

(52) U.S. Cl.
CPC ............... *G08G 1/00* (2013.01); *H04N 7/18* (2013.01); *H04N 7/183* (2013.01)

(58) Field of Classification Search
USPC .......................................................... 382/103
See application file for complete search history.

(56) References Cited

U.S. PATENT DOCUMENTS

| | | | | |
|---|---|---|---|---|
| 2006/0165386 | A1* | 7/2006 | Garoutte | G08B 13/19608 386/210 |
| 2006/0259218 | A1 | 11/2006 | Wu et al. | |
| 2010/0208076 | A1 | 8/2010 | Kinoshita | |
| 2011/0267269 | A1* | 11/2011 | Tardif | H04N 21/422 345/158 |
| 2017/0274897 | A1 | 9/2017 | Rink et al. | |

FOREIGN PATENT DOCUMENTS

| | | |
|---|---|---|
| DE | 10 2015 208 358 A1 | 11/2015 |
| JP | 9-63000 A | 3/1997 |
| JP | 2003-112671 A | 4/2003 |
| JP | 2008-33822 A | 2/2008 |
| JP | 2009-98738 A | 5/2009 |
| JP | 2011-141655 A | 7/2011 |
| JP | 2015-122101 A | 7/2015 |

OTHER PUBLICATIONS

International Search Report (PCT/ISA/210) issued in PCT Application No. PCT/JP2017/014368 dated Jun. 13, 2017 with English translation (six pages).

Japanese-language Written Opinion (PCT/ISA/237) issued in PCT Application No. PCT/JP2017/014368 dated Jun. 13, 2017 (four pages).

Chinese-language Office Action issued in Chinese Application No. 201780048809.3 dated Aug. 28, 2020 with English translation (16 pages).

* cited by examiner

FIG. 2

RECORDING CONDITION TABLE 221

| RECORDING CONDITION ID | ENVIRONMENT CONDITION | OBJECT CONDITION |
|---|---|---|
| 0001 | NIGHTTIME-FEW LIGHTS | PEDESTRIAN |
| 0003 | DAYTIME | TWO-WHEELED VEHICLE |
| 0010 | NIGHTTIME-MANY LIGHTS | PEDESTRIAN |
| 0012 | NIGHTTIME-FEW LIGHTS | LANE CHANGE |
| 0014 | BACKLIGHT | SUDDEN BRAKING |
| 0020 | DAYTIME | SIGN |
| ** | ** | ** |

FIG. 4

PROCESSING TABLE 81

| RECORDING CONDITION ID | CONDITION | | PROCESSING METHOD | | OUTPUT | |
| --- | --- | --- | --- | --- | --- | --- |
| | ENVIRONMENT CONDITION | OBJECT CONDITION | RECOGNITION METHOD | VIDEO CORRECTION | ADDITIONAL INFORMATION | |
| 0001 | NIGHTTIME-FEW LIGHTS | PEDESTRIAN | LUMINANCE VALUE, PEDESTRIAN RECOGNITION | GAMMA CORRECTION 1 | PEDESTRIAN COORDINATES (CURRENT COORDINATES/ PREDICTED COORDINATES) | |
| 0003 | DAYTIME | TWO-WHEELED VEHICLE | VEHICLE RECOGNITION | | TWO-WHEELED VEHICLE COORDINATES | |
| 0010 | NIGHTTIME-MANY LIGHTS | PEDESTRIAN | LUMINANCE VALUE, PEDESTRIAN RECOGNITION | GAMMA CORRECTION 2 | PEDESTRIAN COORDINATES (CURRENT COORDINATES/ PREDICTED COORDINATES) | |
| 0012 | NIGHTTIME-FEW LIGHTS | LANE CHANGE | LUMINANCE VALUE, STEERING ANGLE, LANE RECOGNITION | GAMMA CORRECTION 1 | VEHICLE COORDINATES | |
| 0014 | BACKLIGHT | SUDDEN BRAKING | LUMINANCE VALUE, VEHICLE RECOGNITION | GAMMA CORRECTION 3 | VEHICLE COORDINATES | |
| 0020 | DAYTIME | SIGN | SIGN RECOGNITION | SHUTTER 1 | SIGN INFORMATION | |
| ... | ... | ... | ... | ... | ... | |

FIG. 13

| AUXILIARY RECOGNITION INFORMATION TABLE | | | | | |
|---|---|---|---|---|---|
| AUXILIARY RECOGNITION ID | THREE-DIMENSIONAL OBJECT | POSITION | MOVEMENT DIRECTION | SPEED | DISTANCE |
| 0001 | PEDESTRIAN | A1 | RIGHT | V1 | D1 |
| 0002 | PEDESTRIAN | A1 | LEFT | V2 | D2 |
| 0003 | VEHICLE | A2 | RIGHT | V3 | D3 |
| 0004 | VEHICLE | A2 | LEFT | V4 | D4 |

VIDEO OUTPUT SYSTEM

TECHNICAL FIELD

The present invention relates to a video output system.

BACKGROUND ART

In recent years, automatic driving techniques have been actively developed to reduce traffic accidents, reduce congestion, and reduce CO2 by efficient traveling. In a vehicle that is being driven automatically, it is conceivable to present a recognition situation of surrounding environment obtained by a sensor provided in the vehicle to a passenger of the vehicle in order to prevent a user from feeling uncomfortable with the operation of the vehicle. In addition, it is also useful to record an output of the sensor of the vehicle for post analysis when a problem occurs.

PTL 1 discloses an in-vehicle information storage device including: a data acquisition means for constantly acquiring a plurality of types of data from an external device mounted on a vehicle; a memory buffer for temporarily storing the plurality of types of acquired data; a data recording means for selecting only predetermined types of data based on predetermined conditions out of the plurality of types of acquired data; a data storage area for recording data selected by the data recording means out of the predetermined types of data; a scene/situation determination means for determining a plurality of scenes and situations of the vehicle itself and surroundings based on information temporarily stored in the memory buffer; and an acquisition data switching means for designating a type of data to be recorded in the data recording area to the data recording means using the plurality of scenes and situations determined by the scene/situation determination means as the predetermined conditions.

PTL 2 discloses a vehicle mounted video device capable of being operated during an operation of a vehicle, the vehicle mounted video device including: an imaging means for imaging a surrounding situation of the vehicle and outputting a video signal; a video recording means for recording the video signal; a display means for displaying the video signal or an imaging condition at a predetermined part of the vehicle; and an imaging operation means for controlling the imaging means, wherein the imaging operation means is capable of performing zooming of the imaging means and an setting operation in an imaging optical axis direction.

CITATION LIST

Patent Literature

PTL 1: JP 2011-141655 A
PTL 2: JP H9-63000 A

SUMMARY OF INVENTION

Technical Problem

Meanwhile, an image sensor is a representative example of the sensor used for automatic driving. For example, it is conceivable to capture a video around the vehicle by a camera using the image sensor and present a recognition situation of surrounding environment to the passenger by using the video or record the video output from the camera. However, even if the captured video of the camera is directly presented to the passenger, it is difficult for the passenger to grasp the recognition situation of the surrounding environment, and further, the amount of information becomes enormous when the captured video of the camera is directly recorded. Thus, it is required to obtain a video matching predetermined conditions from the captured videos of the camera.

In the invention described in PTL 1, it is difficult to output a video that satisfies the predetermined conditions. In addition, in the invention described in PTL 2, it is premised that a user manually operates the imaging operation means so that it is difficult to obtain a video corresponding to a predetermined condition without the manual operation by the user.

Solution to Problem

A video output system according to a first aspect of the present invention is a video output system provided with: a camera; and an interface device, wherein the interface device is provided with: a condition storage unit which specifies conditions under which a video is to be selected by the camera; and a video output unit which outputs a captured video received from the camera, and wherein the camera is provided with: an image sensor; a video generation unit which generates captured videos on the basis of the output of the image sensor; a condition acquisition unit which acquires the conditions from the interface device; a recognition/comparison unit which determines whether or not each captured video generated by the video generation unit meets the acquired conditions, and if it is determined that a captured video meets the conditions, generates identification information on the basis of recognition results of a subject to be recognized that is included in the captured video determined to meet the conditions, and that is associated with the conditions; and a camera calculation unit which outputs, to the interface device, at least each captured video determined by the recognition/comparison unit as meeting the conditions, from among the captured videos generated by the video generation unit, and the identification information associated with that captured video.

Advantageous Effects of Invention

According to the present invention, it is possible to obtain the video meeting the conditions from the captured video of the camera.

BRIEF DESCRIPTION OF DRAWINGS

FIG. 2 is a diagram illustrating an example of a recording condition table.
FIG. 4 is a diagram illustrating an example of a processing table.

FIG. 13 is a diagram illustrating an example of an auxiliary recognition information table.

DESCRIPTION OF EMBODIMENTS

First Embodiment

Hereinafter, a first embodiment of a video output system 100 will be described with reference to FIGS. 1 to 7.

(Configuration)

Figure 1:
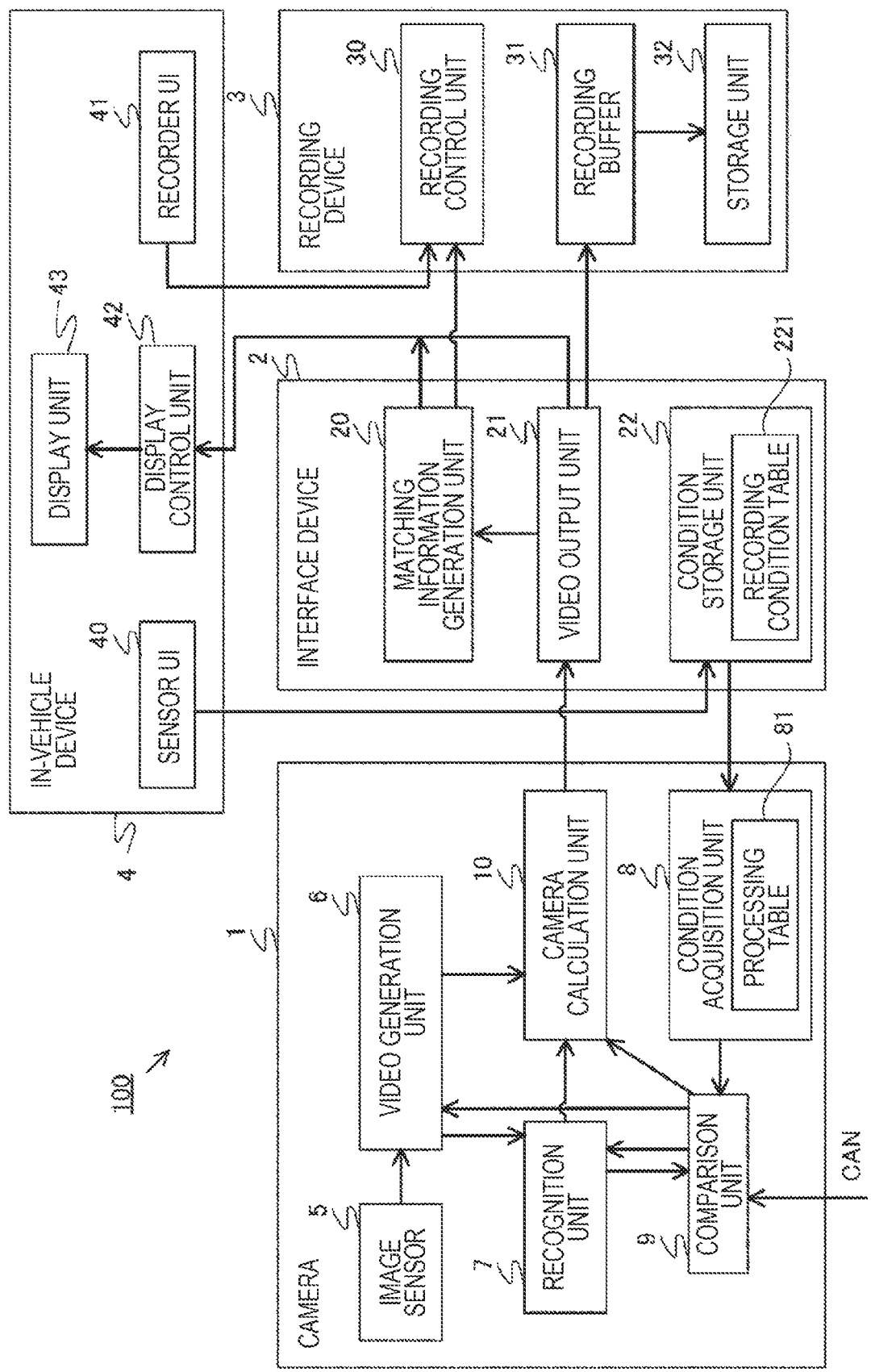
FIG. 1 is a diagram illustrating a configuration of a video output system according to a first embodiment.

FIG. 1 is a diagram illustrating a configuration of the video output system 100 to be mounted on a vehicle. The video output system 100 includes a camera 1, an interface device 2, a recording device 3, and an in-vehicle device 4. The vehicle includes an in-vehicle network, for example, a controller area network (CAN), and the CAN is connected to the camera 1.

The camera 1 includes an image sensor 5 that captures the surroundings of the vehicle, a CPU, a ROM, and a RAM. The CPU deploys and executes a program (not illustrated) stored in the ROM on the RAM to function as a video generation unit 6 which generates a captured video based on an output of the image sensor 5, a recognition unit 7 which recognizes a subject captured in the captured video and outputs identification information and additional information, a condition acquisition unit 8 which acquires a recording condition ID to be described later from the interface device 2, a comparison unit 9 which compares a recognition result obtained by the recognition unit 7 with the recording condition, and a camera calculation unit 10 which outputs the captured video, the additional information, and the identification information to the interface device 2.

The image sensor 5 outputs a signal obtained by capturing the surroundings of the vehicle to the video generation unit 6. The image sensor 5 starts to operate when power of the camera 1 is turned on.

The video generation unit 6 generates a captured video based on an output of the image sensor 5. The video generation unit 6 outputs the generated captured video to the recognition unit 7 and the camera calculation unit 10. The captured video is a group of images arranged in a time-series order, and the images constituting the captured video are also referred to as "frames" hereinafter. In addition, a reference timing, for example, the number of shots from the start of capturing is also referred to as a "frame number". For example, the tenth frame from the start of capturing is called the "tenth frame" or a "frame with frame number 10".

The captured video from the video generation unit 6, and a recognition method, information on correction of the captured video, and a type of additional information from the condition acquisition unit 8 are input to the recognition unit 7. The recognition unit 7 performs recognition processing with an object such as a pedestrian, a vehicle, a two-wheeled vehicle, a sign, and a road lane marker and an environment such as daytime, nighttime, a backlight state as subjects to be recognized, and includes recognition method respectively suitable for recognizing these subjects to be recognized in the captured video. The recognition unit 7 performs recognition processing on each of the frames constituting the captured video using a recognition method designated by the condition acquisition unit 8, and outputs identification information and additional information to the camera calculation unit 10 when recognizing the object or environment as the subject to be recognized corresponding to the recognition method within a frame to be processed. However, the recognition unit 7 also outputs the identification information to the comparison unit 9. For example, the recognition unit 7 identifies that an object such as a pedestrian and a two-wheeled vehicle is captured in the frame to be processed, that the environment in which the frame to be processed has been captured is daytime or a backlight state, and outputs corresponding identification information. The identification information is, for example, a predetermined three-digit integer, and "001" when the pedestrian is recognized, "002" when the two-wheeled vehicle is recognized, and "004" when it is recognized as the backlight state are output as the identification information. When a plurality of objects and a plurality of types of environments are recognized at the same time, for example, one obtained by concatenating identification information corresponding to each recognition is output as one piece of identification information. The additional information is information on a subject to be recognized, which has been recognized by the recognition unit 7 in the captured video, and coordinates of an object are output as the additional information, for example, when the object such as a pedestrian and a vehicle is recognized as the subject to be recognized. However, the recognition unit 7 may perform recognition processing every predetermined number of frames, for example, every ten frames, instead of every frame.

The condition acquisition unit 8 includes a processing table 81. The processing table 81 stores a plurality of conditions under which the recording device 3 records a captured video, a recognition method for each condition, correction to the captured video to be output, and additional information to be output. Which one of the plurality of conditions stored in the processing table 81 is currently valid is specified based on the recording condition ID acquired from the interface device 2. The processing table 81 will be described later. Based on the processing table 81 and the recording condition ID, the condition acquisition unit 8 outputs the recording condition, which is the condition under which the recording device 3 records the captured video, to the comparison unit 9, outputs information relating to the correction of the captured video to the camera calculation unit 10, and outputs the recognition method and a type of the additional information to the recognition unit 7.

For a frame of the captured video from which the recognition unit 7 has recognized a specific object or environment in the above-described recognition processing, the comparison unit 9 determines whether the frame meets the recording condition output from the condition acquisition unit based on the identification information output by the recognition unit 7 and an operation state of the vehicle obtained from the CAN. The operation state of the vehicle obtained from the CAN is, for example, rotation speed of an engine, vehicle speed, an operation of a brake, acceleration, and the like. The comparison unit 9 outputs success/failure information indicating that the condition is satisfied when determining that the recording condition is satisfied, for example, success/failure information whose value is "1", to the camera calculation unit 10, and outputs success/failure information indicating that the condition is not satisfied when determining that the recording condition is not satisfied, for example, success/failure information whose value is "0" to the camera calculation unit 10.

The camera calculation unit 10 outputs the captured video output from the video generation unit 6 to the interface device 2. Further, when the recognition unit 7 outputs the identification information and the additional information and the comparison unit 9 determines that the recording condition is satisfied, the identification information and the additional information are added to the captured video, and outputs the resultant to the interface device 2. On the other hand, when the recognition unit 7 does not output the identification information and the additional information or when the comparison unit 9 determines that the recording condition is not satisfied, only the captured video is output to the interface device 2 without adding the identification information and the additional information. However, when adding the identification information and the additional information, the camera calculation unit 10 performs correction of the captured video based on an instruction of the condition acquisition unit 8, for example, correction of a gamma value, and then outputs the resultant. The camera calculation unit 10 may process the captured video such that the object that has been recognized by the recognition unit 7 can be easily identified based on the additional information output by the recognition unit 7. For example, the camera calculation unit 10 performs a process of surrounding the object that has been recognized by the recognition unit 7 with a circle or a rectangle.

The interface device 2 includes a CPU, a ROM, a RAM, and a nonvolatile memory. The CPU deploys and executes a program (not illustrated) stored in the ROM on the RAM to function as a matching information generation unit 20, a video output unit 21, and a condition storage unit 22.

The matching information generation unit 20 generates condition matching information indicating a head frame and a last frame among frames matching the capturing conditions in the captured video based on the identification information. The matching information generation unit 20 outputs the generated condition matching information to the recording device 3 and the in-vehicle device 4.

The captured video, the identification information, and the additional information are input to the video output unit from the camera 1. The video output unit 21 outputs the input captured video, identification information, and additional information to the recording device 3. The video output unit 21 also outputs the input captured video to the in-vehicle device 4.

The condition storage unit 22 includes a recording condition table 221, specifies a recording condition ID corresponding to a recording condition from the recording condition table 221 when the recording condition is input from the in-vehicle device 4, stores the specified recording condition in the nonvolatile memory, and outputs the recording condition ID to the camera 1. However, the condition storage unit 22 may output the recording condition ID stored in the nonvolatile memory to the camera 1 at an appropriate timing, for example, when detecting that the camera 1 is activated. The output of the recording condition ID to the camera 1 is realized in such a manner that, for example, the interface device 2 serves as a master, the camera 1 serves as a slave in serial communication, and the interface device 2 sends a clock and data to the slave.

The recording device 3 is, for example, a drive recorder including a CPU, a ROM, a RAM, and a nonvolatile memory. The CPU deploys and executes a program (not illustrated) stored in the ROM on the RAM to function as a recording control unit 30. The recording control unit 30 causes a part of the captured video temporarily stored in the recording buffer 31 to be stored in the storage unit 32 based on the condition matching information received from the interface device 2. Since the condition matching information is the information indicating the head frame and the last frame meeting the recording conditions as described above, the storage unit 32 stores the head frame to the last frame. However, when receiving a recording instruction from a recorder UI 41 to be described later, the recording control unit 30 stores the captured videos received from the interface device 2 in the storage unit 32 regardless of the condition matching information while the instruction continues.

The recording buffer 31 is realized using an area of the RAM, and temporarily stores the captured video, the identification information, and the additional information received from the interface device 2. The storage unit 32 is realized using an area of the nonvolatile memory, and stores a part of the captured video based on an instruction of the recording control unit 30. The storage unit 32 further stores the identification information and the additional information to be stored in the recording buffer 31.

The in-vehicle device 4 is, for example, a car navigation device including a display unit 43 and a CPU, a ROM, a RAM, and an input unit (not illustrated). The CPU deploys and executes a program (not illustrated) stored in the ROM on the RAM to serve as a sensor user interface (hereinafter referred to as the "sensor UI") 40, a recorder user interface (hereinafter referred to as the "recorder UI") 41, and a display control unit 42. The sensor UI 40 is a user interface configured to set the recording condition. When the user operates the sensor UI 40 to set the recording condition, such setting is output to the interface device 2.

The recorder UI 41 outputs a recording start command and a recording end command to the recording device 3 based on the user's operation. For example, the in-vehicle device 4 outputs the recording start command when the user presses a button (not illustrated), and outputs the recording end command when the user finishes pressing the button.

The display unit 43 displays a video output from the display control unit 42. The captured video and the condition matching information are input to the display control unit 42 from the interface device 2. The display control unit 42 outputs the captured video meeting the recording conditions to the display unit 43 based on the condition matching information received from the interface device 2. That is, if the recording start command is excluded, the captured video displayed on the display unit 43 is the same as the captured video recorded in the storage unit 32.

(Recording Condition Table)

FIG. 2 is a diagram illustrating an example of the recording condition table 221. The recording condition is a combination of an environmental condition and an object condition. The recording condition table 221 is a table showing the correspondence between the recording condition ID and the combination of the environmental condition and the object condition. The environmental condition is a condition relating to an environment of a captured video, for example, "there are few lights at nighttime" or "daytime". The object condition is a condition relating to a subject of a captured video, that is, an object captured in the captured video, and, for example, that a "pedestrian" and a "two-wheeled vehicle" is captured. In addition, the condition on the object includes not only that a specific object is captured but also that a target event such as a lane change and a sudden braking is performed in the vehicle. Whether or not the target event has been performed is determined based on a situation estimated from temporal context of the subject in the captured video, an operation situation of the vehicle obtained from the CAN, and the like.

The recording condition ID is defined for each combination of the environmental condition and the object condition. For example, as illustrated in FIG. 2, a recording condition ID "0001" corresponds to a combination of the environmental condition, "there are few lights at nighttime" and the object condition that the object to be captured is the "pedestrian".

(Sensor UI)

Figure 3:
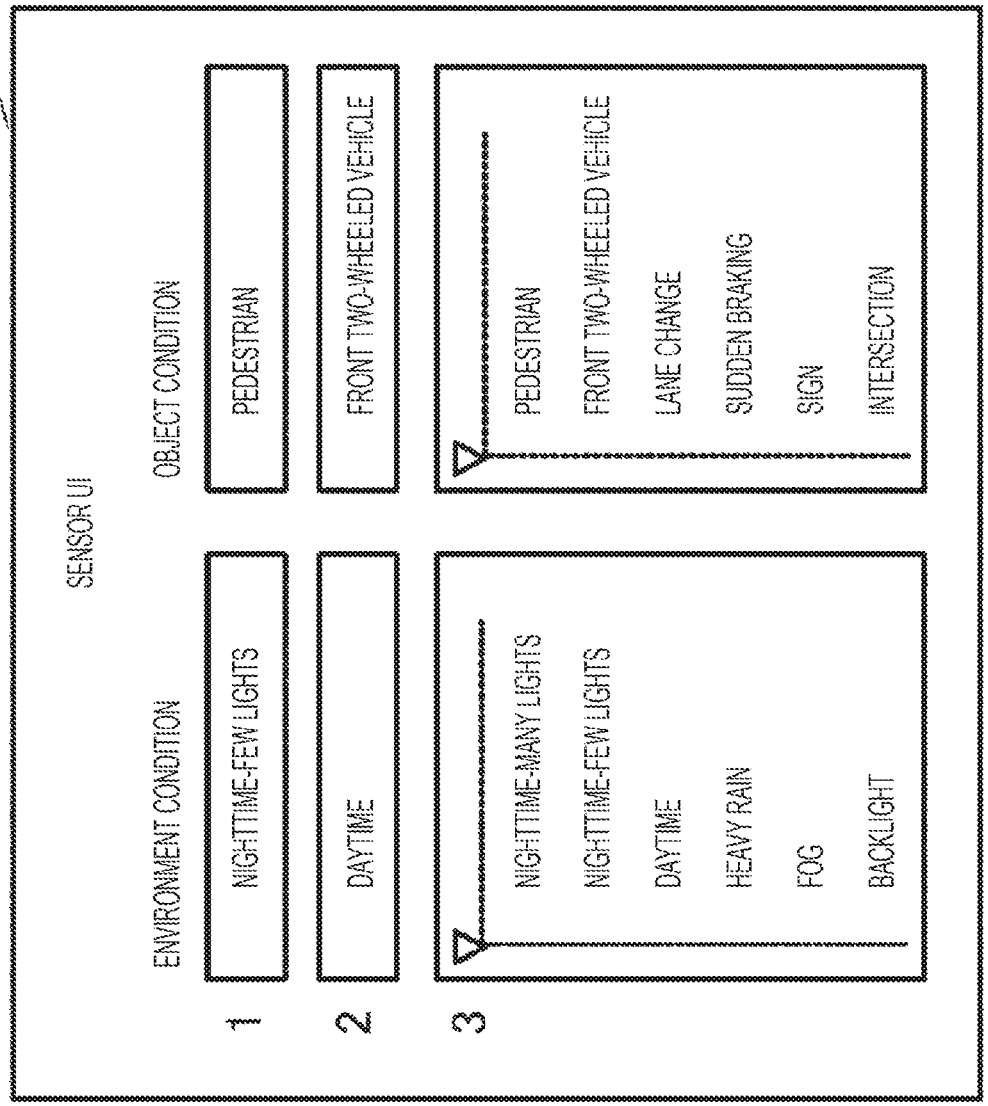
FIG. 3 is a diagram illustrating an example of a sensor UI.

FIG. 3 is a diagram illustrating an example of the sensor UI 40. The sensor UI 40 illustrated in FIG. 3 is configured to independently select an environmental condition and an object condition constituting recording conditions. Although FIG. 3 illustrates an example of the sensor UI 40 in which three sets of environmental conditions and object conditions can be selected, at least one set of an environmental condition and an object condition may be selected. When the user selects desired environmental condition and object condition, respective conditions are output to the condition storage unit 22. The condition storage unit 22 refers to the recording condition table 221 to specify a recording condition ID corresponding to the output conditions and saves the recording condition ID and outputs the recording condition ID to the camera 1.

(Processing Table)

FIG. 4 is a diagram illustrating an example of the processing table 81. The processing table 81 illustrated in FIG. 4 illustrates combinations of conditions, recognition methods of captured videos, and information on outputs. The condition includes the fields of "recording condition ID", "environmental condition", and "object condition", the recognition method of the captured video includes the field of "recognition method", and the information on the output includes the fields of "image correction" and "additional information". In the field of "recording condition ID", a value of a recording condition ID output from the condition storage unit 22 is stored. Since a plurality of records is stored in the processing table 81, the condition acquisition unit 8 acquires the value of the recording condition ID from the interface device 2 to determine a currently valid record. Values stored in the fields of "recording condition ID", "environmental condition", and "object condition" are the same as those of the recording condition table 221 illustrated in FIG. 2. In the field of "recognition method", information specifying a recognition method to be executed on a captured video to determine a condition for recording is stored.

For example, when a recording condition ID is "0001", the recognition unit 7 determines that the recording conditions are satisfied if a captured video is in an environment with there are few lights at nighttime and a pedestrian is captured, and it is indicated an evaluation of a brightness value and a pedestrian recognition processing needs to be executed for such a determination. Then, when the recording conditions are satisfied, the camera calculation unit 10 performs gamma correction on the captured video and outputs the corrected video to the interface device 2, and outputs coordinates of the pedestrian as additional information. In addition, the camera calculation unit 10 also outputs identification information indicating what the recognition unit 7 has identified as described above.

(Operation Example)

Figure 5:
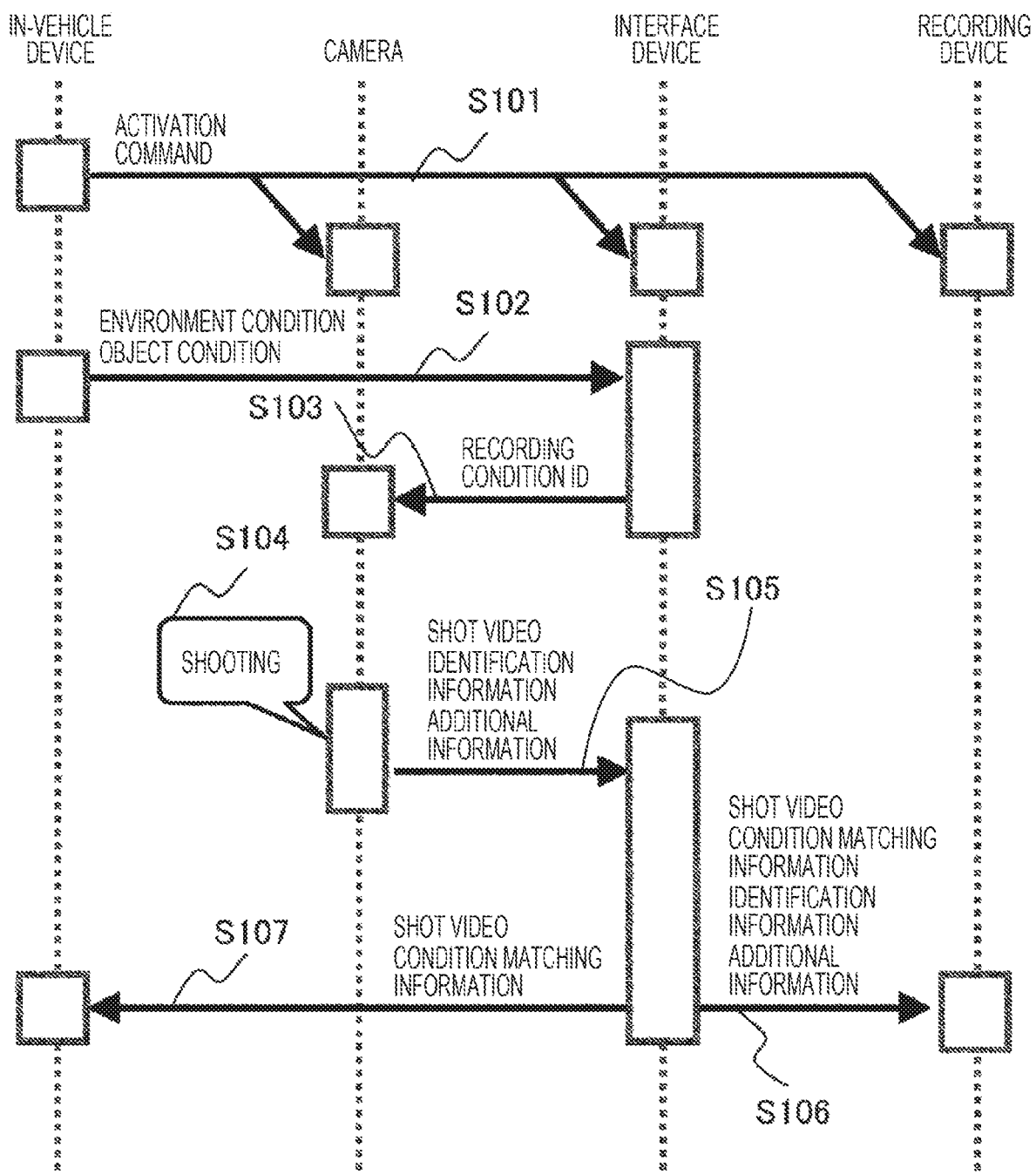
FIG. 5 is a diagram illustrating an outline of an operation of the video output system.

FIG. 5 is a diagram illustrating an outline of an operation of the video output system 100. In FIG. 5, time passes from the upper part to the lower part of the drawing. Squares in the drawing indicate that each device is operating.

First, the user operates the in-vehicle device 4 to activate the camera 1, the interface device 2, and the recording device 3 (S101). Next, when the user operates the sensor UI 40 to set the environmental condition and the object condition (S102), the interface device 2 refers to the recording condition table 221 to retrieve the corresponding recording condition ID, and records the recording condition ID and outputs the recording condition ID to the camera 1 (S103).

Next, the camera 1 performs capturing (S104), and the camera calculation unit 10 outputs the captured video, the identification information, and the additional information to the interface device 2 when it is determined by the recognition unit 7 and the comparison unit 9 that the captured video meets the recording conditions (S105). When receiving these, the interface device 2 creates the condition matching information based on the identification information. Then, the interface device 2 outputs the captured video, the condition matching information, the identification information, and the additional information to the recording device 3 (S106), and outputs the captured video and the condition matching information to the in-vehicle device 4 (S107).

Incidentally, when determining that the captured video does not meet the recording conditions, the camera 1 outputs the captured video to the interface device 2, but does not output the identification information or the added information. In this case, the captured video is not displayed on the in-vehicle device 4 since the interface device 2 does not generate the condition matching information. In addition, the captured video is not recorded in the recording device 3 except for the case where the recording start command is output from the recorder UI 41 of the in-vehicle device 4.

(Flowchart)

Figure 6:
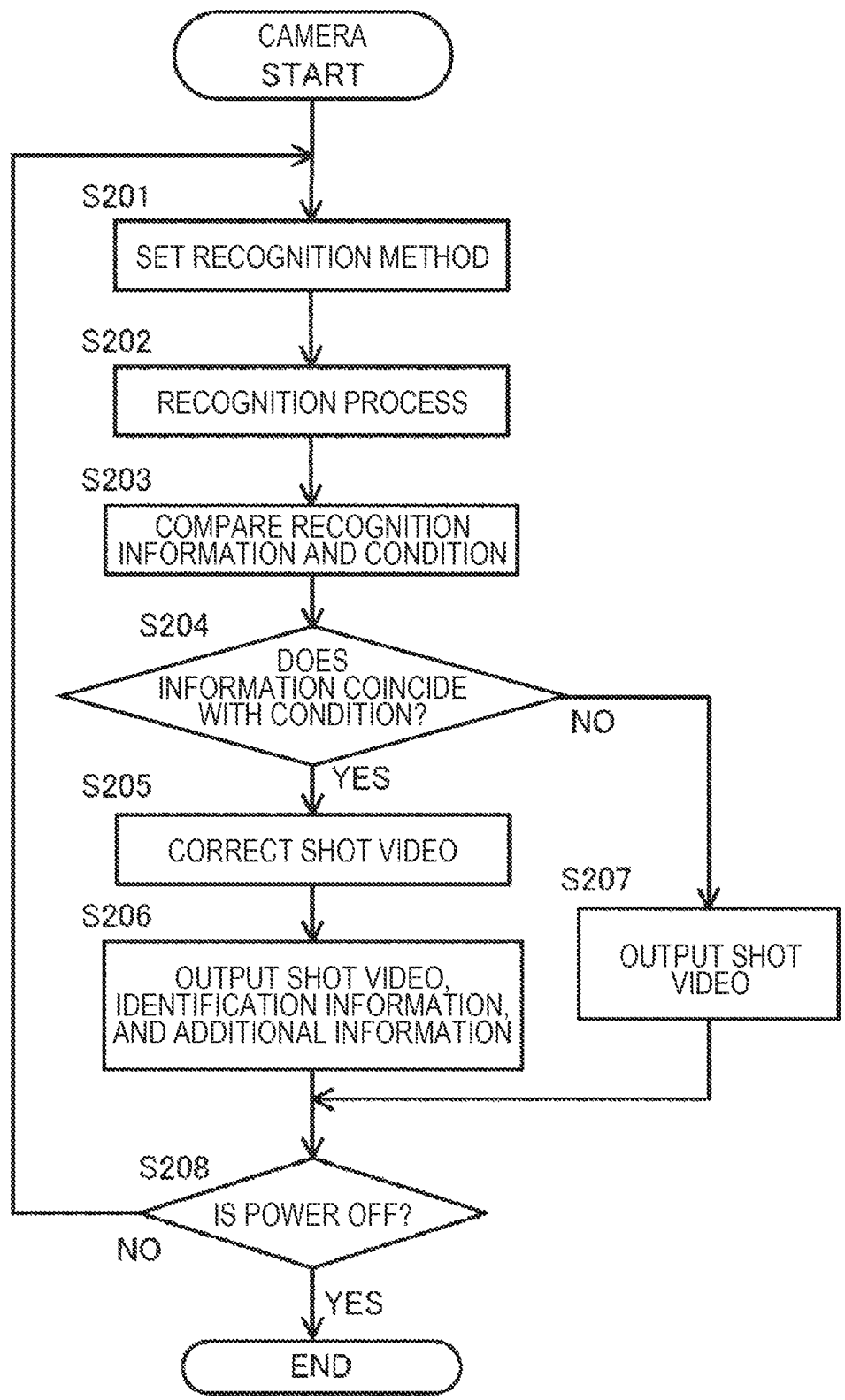
FIG. 6 is a flowchart illustrating operations of a recognition unit, a comparison unit, and a camera calculation unit of a camera according to the first embodiment.

FIG. 6 is a flowchart illustrating operations of the recognition unit 7, the comparison unit 9, and the camera calculation unit 10 of the camera 1. An executing entity of each step described hereinafter is a CPU (not illustrated) provided in the camera 1. When the power of the camera 1 is turned on and the video generation unit 6 generates a captured video, the operation to be described hereinafter starts. Although not described in the following flowchart, generation of the captured video by the video generation unit 6, that is, generation of a new frame of the captured video is performed at any time.

In step S201, the recognition unit 7 sets a recognition method to be used for a recognition process of a subject to be recognized according to the specified recording conditions based on the output of the condition acquisition unit 8, and also specifies which information to be output as the additional information. In the following step S202, the recognition unit 7 executes the recognition process using the new frame, generated as the captured video, as a target and generates the identification information and the additional information. In the following step S203, the comparison unit compares the identification information generated by the recognition unit 7 with the recording conditions. At this time, when it is specified as the recording conditions that the target event such as the lane change and the sudden braking has been performed in the vehicle as described above, the operation state or the like of the vehicle obtained from the CAN is also used as necessary to perform a comparison process in step S203. In the following step S204, the process proceeds to step S205 when it is determined in the comparison in step S203 that the identification information coincides with the recording conditions, and proceeds to step 207 when it is determined that the identification information does not coincide with the recording conditions. In step S205, the camera calculation unit 10 corrects the captured video based on the output of the condition acquisition unit 8. In the following step S206, the camera calculation unit 10 outputs the captured video corrected in step S205 and the identification information and the additional information generated by the recognition unit 7 to the interface device 2, and the process proceeds to step S208.

The captured video generated by the video generation unit 6 is output to the interface device 2 in step S207 executed when a negative determination is made in step S204, and the process proceeds to step S208. At this time, information indicating that the recording conditions are not satisfied may be added to the captured video and output, instead of the identification information and the additional information which are added to the captured video and output in step S206. In step S208, it is determined whether or not the power has been switched off, and the flow chart illustrated in FIG. 6 is ended when it is determined that the power has been turned off, and the process returns to step S201 when it is determined that the power has not been turned off.

Figure 7:
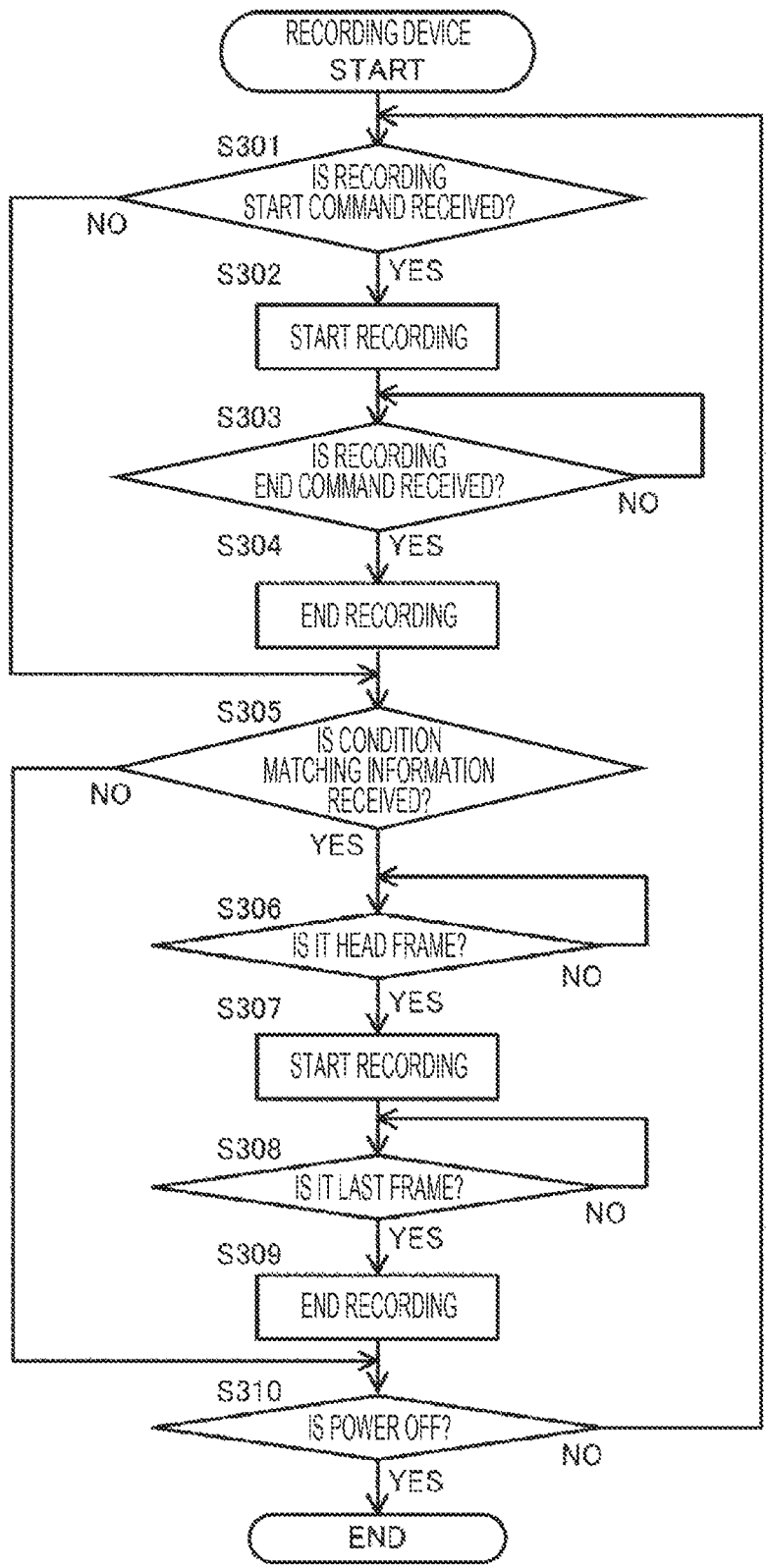
FIG. 7 is a flowchart illustrating an operation of a recording device.

FIG. 7 is a flowchart illustrating an operation of the recording device 3. An executing entity of each step described below is the recording control unit 30, that is, a CPU (not illustrated) provided in the recording device 3. When a power of the recording device 3 is turned on, the recording control unit 30 starts the operation to be described hereinafter. Although not described in the following flowchart, reception of information from the interface device 2 and the in-vehicle device 4 is performed at any time.

In step S301, it is determined whether or not the recording start command has been received from the recorder UI 41 of the in-vehicle device 4. The process proceeds to step S302 when it is determined that the recording start command has been received, and proceeds to step S305 when it is determined that the recording start command has not been received. In step S302, recording of the captured video, the identification information, and the additional information, received from the interface device 2, to the storage unit 32 is started. However, only the captured video is recorded in the storage unit 32 when the identification information and the additional information are not output although the captured video is output from the interface device 2. As described above, the reception of information from the interface device 2 is performed at any time, and this recording is continued until step S304 to be described below is executed. In step S303, it is determined whether or not the recording end command has been received from the recorder UI 41. The process proceeds to step S304 when it is determined that the recording end command has been received, and remains in step S303 when it is determined that the recording end command has not been received. In step S304, the recording to the storage unit 32 is ended, and the process proceeds to step S305.

In step S305, it is determined whether or not the condition matching information has been received from the interface device 2. The process proceeds to step S306 when it is determined that the condition matching information has been received, and proceeds to step S310 when it is determined that the condition matching information has not been received. In step S306, it is determined whether or not the head frame of the captured video specified from the condition matching information has been received. The process proceeds to step S307 when it is determined that the head frame has been received, and remains in step S306 when it is determined that the head frame has not been received. In step S307, recording of the captured video, the identification information, and the additional information, received from the interface device 2, to the storage unit 32 is started. In the following step S308, it is determined whether or not the last frame of the captured video specified from the condition matching information has been received. The process proceeds to step S309 when it is determined that the last frame has been received, and remains in step S308 when it is determined that the last frame has not been received. In step S309, the recording to the storage unit 32 is ended, and the process proceeds to step S310. In step S310, it is determined whether or not the power has been switched off, and the flow chart illustrated in FIG. 7 is ended when it is determined that the power has been turned off, and the process returns to step S301 when it is determined that the power has not been turned off.

According to the above-described first embodiment, the following operational effects are obtained.

(1) The video output system 100 includes the camera 1 and the interface device 2. The interface device 2 includes the condition storage unit 22 which specifies the recording conditions, which are the conditions under which the video is to be selected by the camera 1, and the video output unit 21 which outputs the captured video received from the camera 1. The camera 1 includes: the image sensor 5; the video generation unit 6 which generates captured videos on the basis of the output of the image sensor 5; the condition acquisition unit 8 which acquires recording conditions from the interface device 2; a recognition/comparison unit, that is, the recognition unit 7 and the comparison unit 9, which determines whether or not each captured video generated by the video generation unit 6 meets the recording conditions, and if it is determined that a captured video meets the recording conditions, generates identification information on the basis of recognition results of a subject to be recognized that is included in the captured video determined to meet the recording conditions, and that is associated with the recording conditions; and the camera calculation unit 10 which outputs, to the interface device 2, at least each captured video determined by the comparison unit 9 as meeting the recording conditions, from among the captured videos generated by the video generation unit 6, and the identification information. Thus, it is possible to obtain a video meeting the recording conditions from the captured video of the camera 1.

(2) The interface device 2 includes the matching information generation unit 20 which generates the condition matching information which indicates the head frame meeting the condition and the last frame meeting the conditions in the captured video received from the camera 1 based on the identification information output from the camera 1. The matching information generation unit 20 outputs the condition matching information.

Thus, it is possible to discriminate the frame that meets the recording conditions out of the captured video to be output. Further, it is possible to create the condition matching information in association with a data format predetermined in the recording device 3 or the in-vehicle device 4 with the interface device as a data output destination.

(3) The video output system 100 includes the recording device 3. The recording device 3 includes the storage unit 32 in which videos are stored, and the recording control unit 30 which records captured videos output by the video output unit of the interface device 2 in the storage unit 32 based on the condition matching information. Therefore, the recording device 3 can record the captured videos meeting the recording conditions.

(4) The video output system 100 includes the in-vehicle device 4 which also serves as a display device. The in-vehicle device 4 includes the display unit 43 on which a video is displayed, and the display control unit 42 which displays the captured videos output by the video output unit 21 of the interface device 2 on the display unit 43 based on the condition matching information. Therefore, the in-vehicle device 4 can display the captured videos meeting the recording conditions. For example, when a vehicle is automatically operated, a passenger of the vehicle can estimate movement of the vehicle in advance by looking at the display on the display unit 43 and obtain a sense of security by designating an event that triggers the vehicle to operate as a capturing condition. Specifically, when an algorithm to stop the vehicle when a pedestrian is detected in automatic operation is included, a video of a pedestrian is displayed on the display unit 43 when the vehicle stops by setting the capturing condition to "pedestrian detection".

(5) The capturing condition includes at least one of the environmental condition and the object condition. The recognition unit 7 further outputs additional information on the subject to be recognized, and the camera calculation unit processes the captured video based on the additional information and outputs the processed video.

Thus, it is possible to process and output the captured video based on the recognition result of the recognition unit 7.

(6) The video output system 100 includes the in-vehicle device 4 to which the user inputs the recording conditions. The recording conditions input by the user using the in-vehicle device 4 are stored in the condition storage unit 22 of the interface device 2. Thus, the user can arbitrarily set the recording conditions.

The first embodiment described above may be modified as follows.

(Modification 1)

The camera 1 may output a captured video only when the comparison unit 9 determines that the recording conditions are satisfied. When the comparison unit 9 determines that the recording conditions are not satisfied, the camera calculation unit 10 may output information indicating that the recording conditions are not satisfied, or does not necessarily output the information. In addition, when the comparison unit 9 determines that the recording conditions are not satisfied, a video signal is not necessarily output directly, or a black-filled or white-filled video may be output. In addition, the video output unit 21 does not necessarily output the condition matching condition in the present modification.

The display control unit 42 of the in-vehicle device 4 does not perform special processing even if receiving the condition matching information. When receiving captured videos from the interface device 2, the display control unit 42 displays the captured videos on the display unit 43 without selecting the video based on the condition matching information as in the first embodiment.

Figure 8:
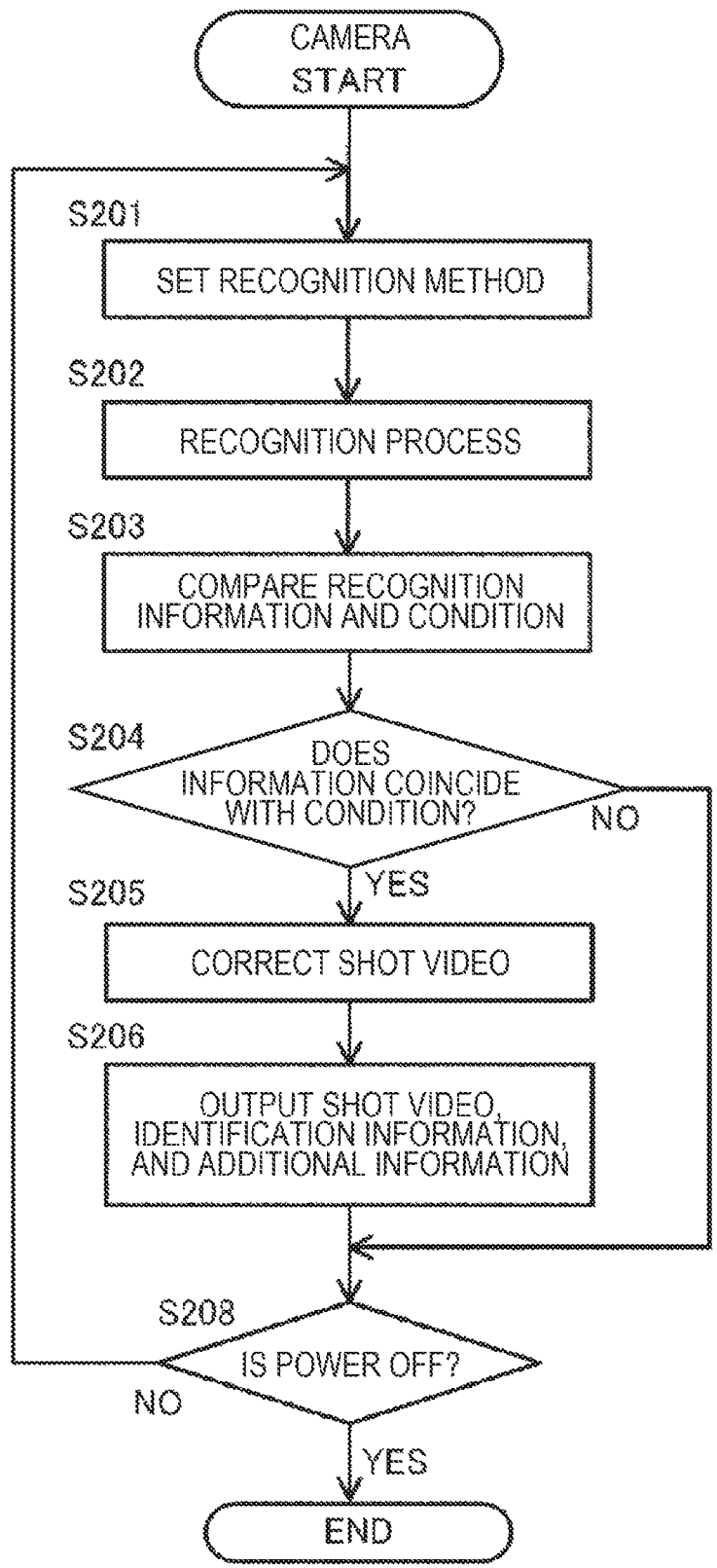
FIG. 8 is a flowchart illustrating operations of a recognition unit, a comparison unit, and a camera calculation unit of a camera according to Modification 1.

FIG. 8 is a flowchart illustrating operations of the recognition unit 7, the comparison unit 9, and the camera calculation unit 10 of the camera 1 according to Modification 1. A difference from the flowchart illustrated in FIG. 6 in the first embodiment is that there is no step S207. That is, the process proceeds to step S208 without outputting the captured video or the like when a negative determination is made in step S204 in the present modification.

According to Modification 1, the following operational effect can be obtained in addition to the effects of the first embodiment.

(7) The video output system 100 includes the in-vehicle device 4 including the display unit 43 which displays the captured video output from the interface device 2. The camera calculation unit 10 outputs only the captured video determined by the comparison unit 9 as meeting the recording conditions among the captured videos generated by the video generation unit 6. The video output unit 21 outputs the captured video received from the camera calculation unit 10.

Thus, the amount of data to be transmitted from the camera 1 to the interface device 2 can be reduced since the camera 1 outputs only the captured video meeting the recording conditions. The reduction of the amount of communication is highly effective particularly when a plurality of devices is connected to the interface device 2.

(Modification 2)

When the recording control unit 30 of the recording device 3 can determine the necessity of recording of each frame of a captured video based on the identification information and the additional information, or when the display control unit 42 of the in-vehicle device 4 can determine whether or not to perform display based on the identification information and the additional information, the interface device 2 may output the identification information and the additional information instead of the condition matching information without generating the condition matching information. That is, the interface device 2 does not necessarily include the matching information generation unit 20. In this case, the identification information and the additional information output from the camera 1 are directly output to the recording device 3 and the in-vehicle device 4 together with the captured video.

According to Modification 2, the following operational effects can be obtained in addition to the effects of the first embodiment.

(8) The video output unit 21 outputs the captured video and the identification information received from the camera 1.

Thus, the configuration of the interface device 2 can be simplified.

(9) Since a pedestrian can be surrounded with a circle or a rectangle, for example, using the additional information, the display control unit 42 can explicitly inform a driver of an object to be warned.

(Modification 3)

The recognition unit 7 may generate the additional information only when receiving a request from the comparison unit 9 without generating additional information in principle. In this case, the comparison unit 9 requests the recognition unit 7 to generate the additional information when determining that the recording conditions are satisfied.

(Modification 4)

The configurations of the camera 1, the interface device 2, the recording device 3, and the in-vehicle device 4 in the video output system 100 and the division of these functions are defined for the sake of convenience, and different configurations or different divisions of functions may be adopted. For example, the interface device 2 may be integrated with the camera 1, the recording device 3, or the in-vehicle device 4. In addition, correction of a captured video may be performed by a device other than the camera 1, for example, the video output unit 21 of the interface device 2.

(Modification 5)

The configurations of the video generation unit 6, the recognition unit 7, the condition acquisition unit 8, the comparison unit 9, and the camera calculation unit 10 in the camera 1 and the division of these functions are defined for the sake of convenience, and different configurations or different divisions of functions may be adopted. For example, the recognition unit 7 and the comparison unit 9 may be integrally configured, or the video generation unit 6 may correct a captured video. That is, any configuration may be adopted as long as the camera 1 has the functions of the video generation unit 6, the recognition unit 7, the condition acquisition unit 8, the comparison unit 9, and the camera calculation unit 10.

(Modification 6)

The sensor UI 40, the recorder UI 41, and the display unit 43 may be configured as independent devices.

(Modification 7)

Each of the environmental condition and the object condition constituting the recording conditions may include "no condition". For example, when the environmental condition is "no condition" and the object condition is "pedestrian", it is determined that the recording condition is satisfied only by detection of a pedestrian.

(Modification 8)

The video output system 100 may include a plurality of the cameras 1, and the interface device 2 may be connected to the plurality of cameras 1. In this case, for example, the interface device 2 can be dealt with by providing connection ports corresponding to the number of cameras 1. Thus, it is possible to realize the video output system 100 including the plurality of cameras 1 without changing the configurations of the recording device 3 and the in-vehicle device 4.

(Modification 9)

The camera calculation unit 10 may output success/failure information output from the comparison unit 9 together with a captured video. In this case, the video output unit 21 outputs the received success/failure information together with the captured video. Further, the recording device 3 and the in-vehicle device 4 may determine whether or not to record or display captured videos or the like based on the success/failure information. When the recording device 3 and the in-vehicle device 4 determine whether or not to record or display captured videos or the like based on the success/failure information, the interface device 2 does not necessarily include the matching information generation unit 20.

Second Embodiment

A second embodiment of the video output system 100 will be described with reference to FIG. 9. In the following description, a difference will mainly be described by applying the same reference numerals to the same constituent elements as those of the first embodiment. A point not specifically described is the same as that of the first embodiment. The present embodiment is different from the first embodiment mainly in terms that the in-vehicle device has a database function.

(Configuration)

Figure 9:
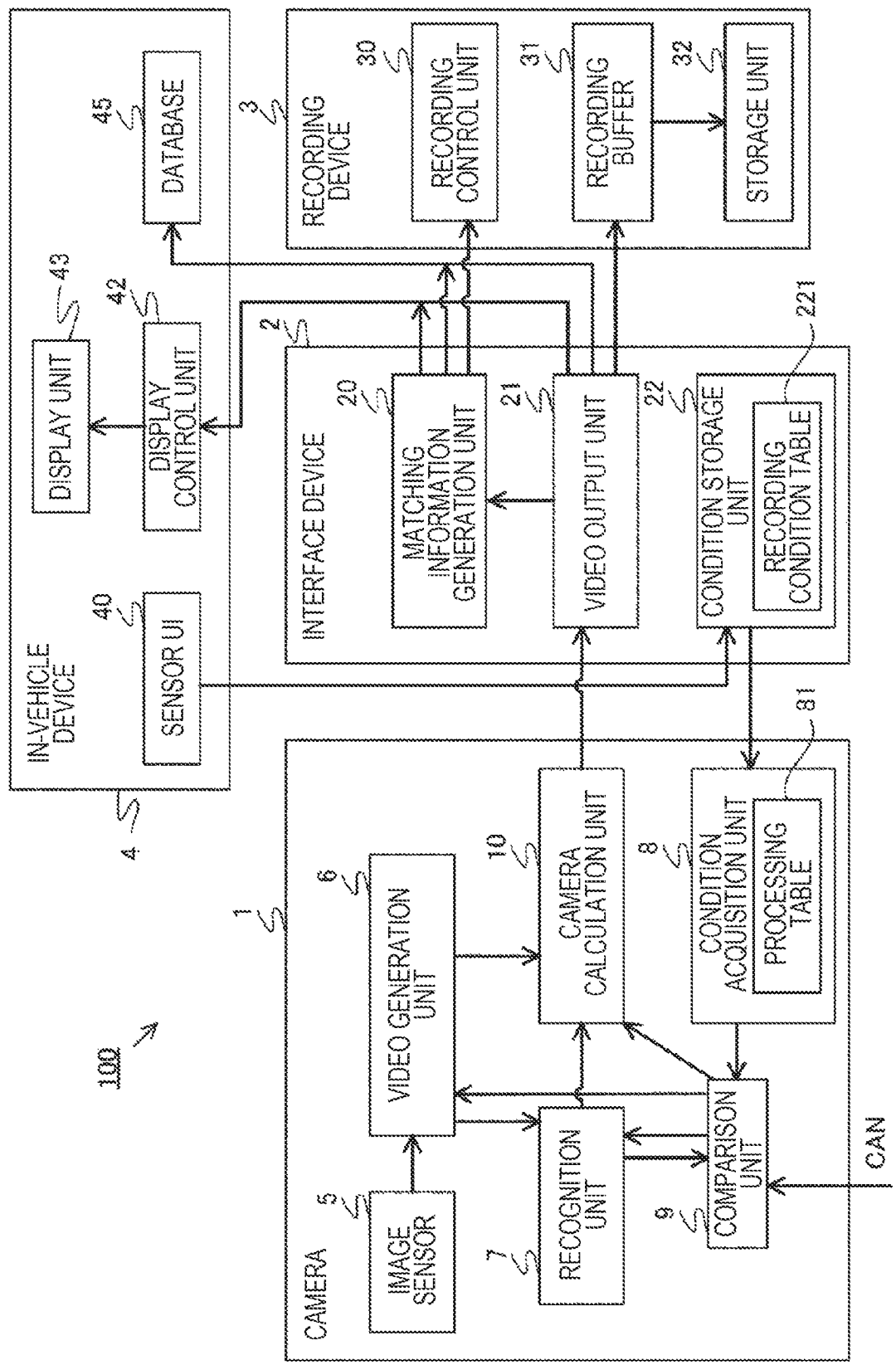
FIG. 9 is a diagram illustrating a configuration of a video output system according to a second embodiment.

FIG. 9 is a diagram illustrating a configuration of the video output system according to the second embodiment. A difference from the first embodiment is that the in-vehicle device 4 further includes a database 45. Incidentally, the recorder UI 41 is not illustrated in FIG. 9.

Condition matching information from the matching information generation unit 20, and identification information and additional information from the video output unit 21 are input to the database 45. However, captured videos are not input to the database 45. In the database 45, recording control information includes information on a frame meeting recording conditions in a captured video and information on the recording conditions is accumulated based on these pieces of input information. A format of the database 45 may be a relational database, a column store database, or another format, and any format may be adopted.

According to the above-described second embodiment, the following operational effect can be obtained in addition to the effects of the first embodiment.

(10) The video output system 100 includes the in-vehicle device 4 including the database 45. The recognition unit 7 of the camera 1 outputs recognition information indicating which of the recording conditions coincides with the captured video. The video output unit 21 outputs the recognition information input from the camera 1 to the in-vehicle device 4. In the database 45, the recording control information including the information on the frame corresponding to the recording conditions in the captured video and the information on the recording conditions is recorded based on the condition matching information and the identification information.

Therefore, since information on the captured videos recorded in the recording device 3 is accumulated in the database 45, it is possible to easily access a desired captured video by searching the database 45.

Third Embodiment

A third embodiment of the video output system 100 will be described with reference to FIGS. 10 to 12. In the following description, a difference will mainly be described by applying the same reference numerals to the same constituent elements as those of the first embodiment. A point not specifically described is the same as that of the first embodiment. The present embodiment is different from the first embodiment mainly in terms that two cameras are connected to an interface device and information is shared between the cameras.

(Configuration)

Figure 10:
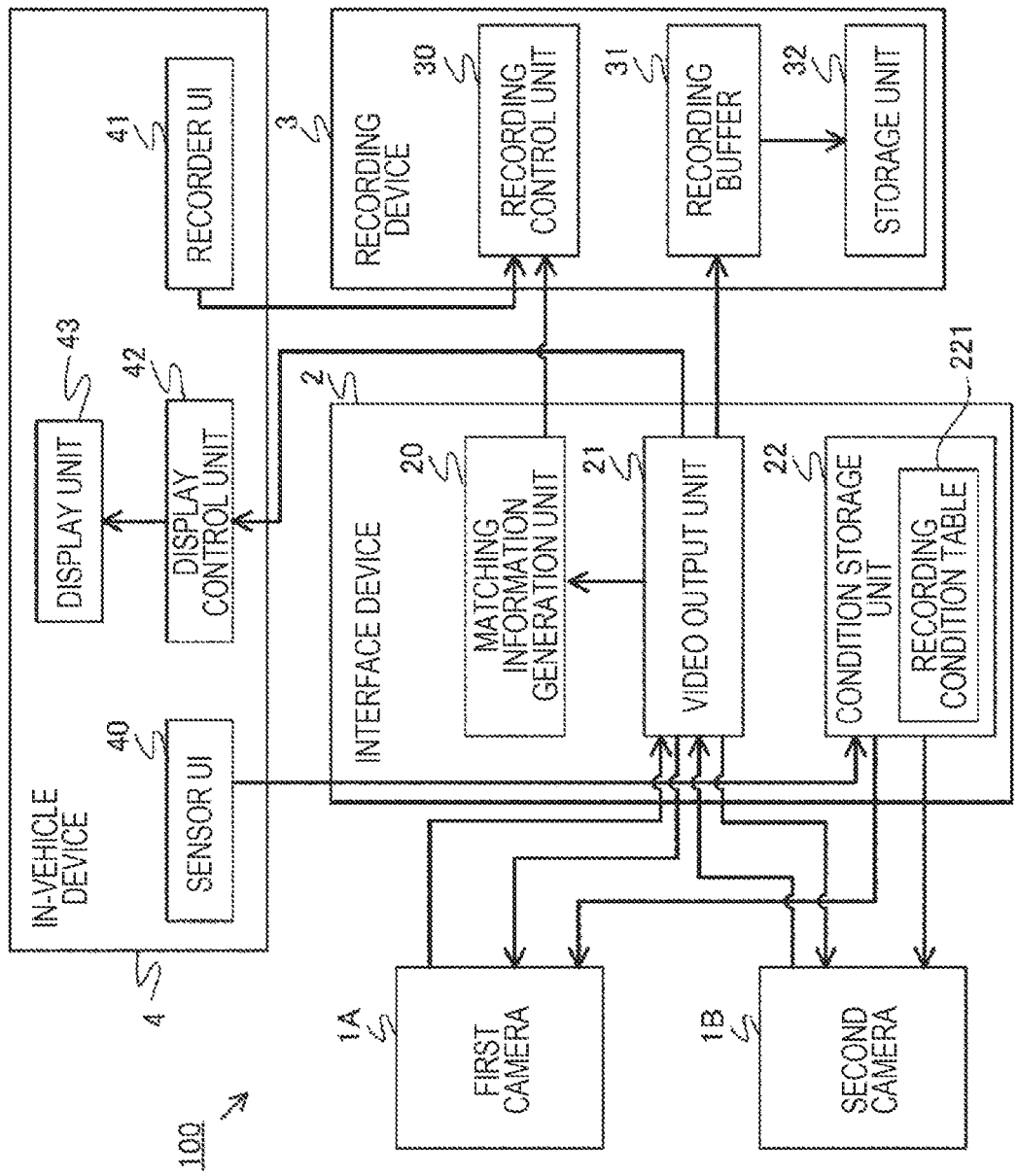
FIG. 10 is a diagram illustrating a configuration of a video output system according to a third embodiment.

FIG. 10 is a diagram illustrating a configuration of the video output system according to the third embodiment. The difference from the first embodiment is that a first camera 1A and a second camera 1B are provided instead of the camera 1. The first camera 1A and the second camera 1B have the same configuration, and ranges to be captured by the cameras are different from each other as described later.

The video output unit 21 of the interface device 2 outputs input identification information to another camera in addition to the operations according to the first embodiment. For example, when identification information is input from the first camera 1A, the identification information is output to the second camera 1B.

Figure 11:
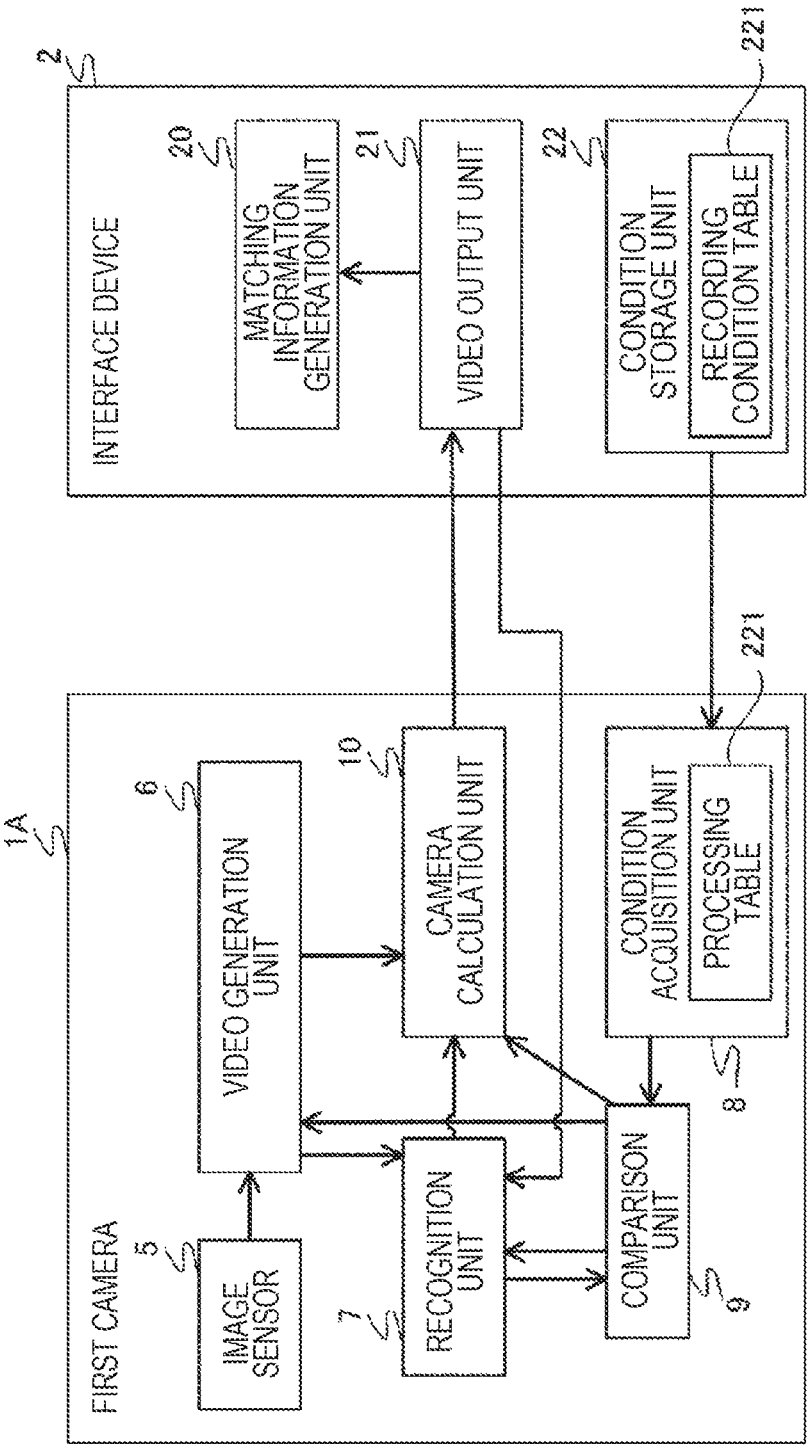
FIG. 11 is a diagram illustrating a configuration of a first camera and a relationship between the first camera and an interface device.

FIG. 11 is a diagram illustrating a configuration of the first camera 1A and a relationship between the first camera 1A and the interface device 2. Since the configurations of the first camera 1A and the second camera 1B are the same as described above, the second camera 1B will not be described. The configuration of the first camera 1A is substantially the same as that of the camera 1 according to the first embodiment, and a difference therebetween is the operation of the recognition unit 7.

When the identification information is input from the interface device 2, the recognition unit 7 executes a process of recognizing a captured video taking the identification information into consideration. For example, a probability that an object recognized by the second camera 1B is captured by the first camera 1A is calculated based on a known positional relationship between the first camera 1A and the second camera 1B, and the calculated probability is taken into consideration in object recognition. In addition, in a case where a result of recognition by another camera is not used when any object is detected from the captured video, it is conceivable to confirm several frames in order to confirm that the object is not noise. However, when the same object is detected in the second camera 1B, it is possible to omit the confirmation over several frames and determine that the object has been recognized and output the identification information.

Operation Example

Figure 12:
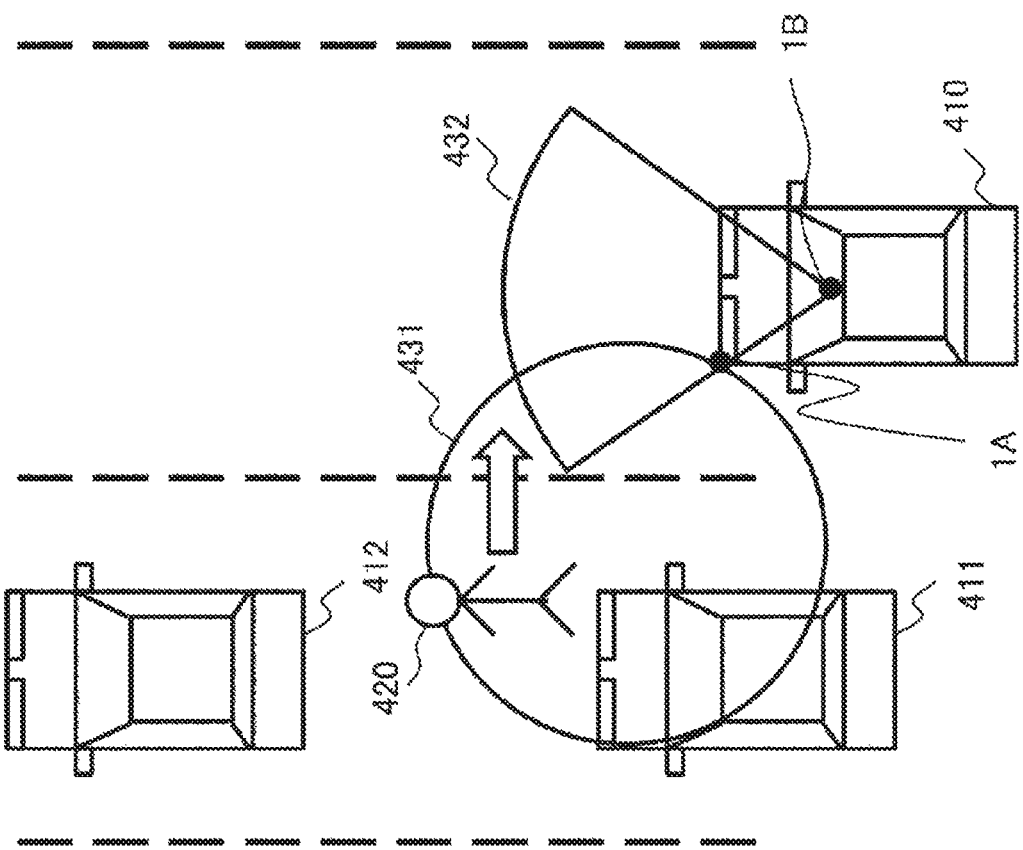
FIG. 12 is a diagram illustrating an operation example according to the third embodiment.

FIG. 12 is a diagram illustrating an operation example according to the third embodiment.

First, a situation of the operation example will be described.

The video output system 100 is mounted to a vehicle 410. The vehicle 410 includes the first camera 1A on the left front side and the second camera 1B at the center. A field of view 431 of the first camera 1A is the front left side of the vehicle 410 and a field of view 432 of the second camera 1B is the front of the vehicle 410. A vehicle 411 and a vehicle 412 are stopped in the next traveling lane where the vehicle 410 travels. A pedestrian 420 is walking in a direction of the vehicle 410 from among these vehicles. A current position of the pedestrian 420 is within a range of the field of view 431 of the first camera 1A, outside a range of the field of view 432 of the second camera 1B. The operation of the video output system 100 in this situation will be described.

Since the pedestrian 420 has moved from the left side in the drawing to the current position, the pedestrian 420 is captured in a plurality of frames of the first camera 1A until now. Thus, the recognition unit 7 of the first camera 1A determines that the pedestrian 420 has been recognized from an analysis result over the plurality of frames of a captured video, and outputs identification information indicating the pedestrian to the video output unit 21 of the interface device 2 via the camera calculation unit 10. The video output unit outputs the identification information received from the first camera 1A to the recognition unit 7 of the second camera 1B. Since the identification information indicating the pedestrian is input, the second camera 1B performs a process of recognizing a captured video taking into consideration that there is a high possibility of detecting a pedestrian compared to other objects. Therefore, when the pedestrian 420 enters the range of the field of view 423 of the second camera 1B, the pedestrian can be quickly recognized.

According to the above-described third embodiment, the following operational effect can be obtained in addition to the effects of the first embodiment.

(11) The video output system 100 includes the first camera 1A and the second camera 1B. The first camera 1A includes: the image sensor 5 which acquires surrounding information; the condition acquisition unit 8 the acquires the conditions from the interface device 2; and a sensor additional information generation unit, that is, the recognition unit 7, the comparison unit 9, and the camera calculation unit 10, which determines whether or not the surrounding information acquired by the image sensor 5 meets the conditions, generates an auxiliary recognition signal indicating whether or not the surrounding information meets the conditions are met, that is, identification information, and outputs the identification information to the interface device 2. The interface device 2 includes an auxiliary recognition signal transfer unit, that is, the video output unit 21 which transmits an identification signal output from the first camera 1A to the second camera 1B. The recognition unit 7 of the second camera 1B determines whether or not the captured video generated by the video generation unit 6 of the second camera 1B and the captured video generated by the video generation unit 6 of the second camera 1B based on the identification information of the first camera 1A transmitted from the interface device 2 meet the conditions.

Thus, it is possible to realize early recognition of captured videos and improvement in recognition accuracy by using recognition results of another camera.

(Modification 1 of Third Embodiment)

The recognition units 7 of the first camera 1A and the second camera 1B may output the auxiliary recognition information in addition to the identification information when recognizing the three-dimensional object. The auxiliary recognition information is information obtained by combining a type, a position, a movement direction, a movement speed, and a distance of a three-dimensional object. For example, the auxiliary recognition information can be transmitted using an auxiliary recognition ID based on a predetermined auxiliary recognition information table.

FIG. 13 is a diagram illustrating an example of the auxiliary recognition information table. The auxiliary recognition information table is constituted by fields of the auxiliary recognition ID, the three-dimensional object, the position, the movement direction, the movement speed, and the distance. A four-digit integer is stored in the field of "auxiliary recognition ID". Information indicating the type of the recognized three-dimensional object is stored in the field of "three-dimensional object". In the field of "position", information indicating a predefined positional relationship is stored. For example, A1 indicates the front left side, and A2 indicates the front right side. In the field of "movement direction", information indicating a direction in which the three-dimensional object is moving is stored. In the field of "movement speed", information indicating the movement speed of the three-dimensional object is stored. In the field of "distance", information indicating the distance to the three-dimensional object is stored.

The auxiliary recognition information table is stored in the first camera 1A and the second camera 1B. When the recognized three-dimensional object corresponds to any of the conditions described in the auxiliary recognition information table, the recognition unit 7 outputs the corresponding auxiliary recognition ID as the auxiliary identification information in addition to the identification information. When receiving the auxiliary recognition information from one of the cameras, the interface device 2 outputs the auxiliary recognition information to the recognition unit 7 of the other camera, which is similar to the identification information. The recognition unit 7 to which the auxiliary recognition information has been input from the interface device 2 recognizes a captured video in consideration of the auxiliary recognition information in addition to the identification information.

According to the present modification, detailed information on the three-dimensional object recognized by another camera can be obtained, and thus, it is more effective for the early recognition of captured videos and the improvement in recognition accuracy.

(Modification 2 of Third Embodiment)

The sensor to be connected to the interface device 2 is not limited to the camera. There is no restriction on a type of the sensor as long as the sensor can acquire surrounding information such as a laser radar and an ultrasonic sensor. In addition, the number of sensors to be connected to the interface device 2 is not limited to two, and may be three or more. In this case, the interface device 2 may output the information acquired by a certain sensor to all the other sensors, or may output the information only to a specific sensor. In addition, any sensor to which information is to be output may be determined in association with the acquired information.

Although it has been assumed that the programs of the camera 1 and the interface device 2 are stored in the ROM (not illustrated), the programs may be stored in a nonvolatile memory. In addition, the camera 1 and the interface device 2 may include input/output interfaces (not illustrated), and the programs may be read from another device through a medium available by the input/output interface if necessary. Here, the medium indicates, for example, a storage medium attachable to and detachable from the input/output interface or a communication medium, that is, a wired, wireless, or optical network, or a carrier wave or a digital signal propagating through the network. In addition, some or all of the functions realized by the programs may be realized by a hardware circuit or an FPGA.

Each of the embodiments and modifications described above may be combined.

Although various embodiment and modifications have been described as above, the present invention is not limited to these contents. Other aspects conceivable within a technical idea of the present invention are also included within the scope of the present invention.

The disclosed content of the following priority application is incorporated herein as the citation.

Japanese Patent Application No. 2016-177322 (filed on Sep. 12, 2016)

REFERENCE SIGNS LIST 1 camera
2 interface device
3 recording device
4 in-vehicle device
5 image sensor
6 video generation unit
7 recognition unit
8 condition acquisition unit
9 comparison unit
10 camera calculation unit
20 matching information generation unit
21 video output unit
22 condition storage unit
30 recording control unit
32 storage unit
42 display control unit
43 display unit
45 database
100 video output system

The invention claimed is:

1. A video output system comprising:
a camera; and
an interface device,
wherein the interface device comprises:
a condition storage unit which specifies conditions under which a video is to be selected by the camera; and
a video output unit which outputs a captured video received from the camera, and
the camera comprises:
an image sensor;
a video generation unit which generates captured videos on the basis of the output of the image sensor;
a condition acquisition unit which acquires the conditions from the interface device;
a recognition unit which sets a recognition method to be used for a recognition process of a subject to be recognized according to conditions specified in a processing table of the condition acquisition unit, specifies information to be output as additional information about the subject, executes the recognition process on each frame of the captured video, as a target, and generates identification information of the subject and the additional information;
a comparison unit that compares the identification information generated by the recognition unit with the conditions of the condition acquisition unit and determines, for a frame of the captured video from which the recognition unit has recognized a specific object or environment in the recognition processing, whether or not the identification information corresponds to a recording condition that is a combination of an environmental condition and an object condition; and
a camera calculation unit which corrects the captured video based on the processing table of the condition acquisition unit and outputs, to the interface device, the corrected captured video, the identification information, and the additional information.

2. The video output system according to claim 1,
wherein the interface device further comprises a matching information generation unit which generates condition matching information indicating a head frame that meets the conditions and a last frame that meets the conditions in a captured video received from the camera based on the identification information output from the camera, and
the matching information generation unit outputs the condition matching information.

3. The video output system according to claim 1,
wherein the video output unit outputs a captured video received from the camera and the identification information.

4. The video output system according to claim 2, further comprising
a recording device,
wherein the recording device comprises:
a storage unit in which a video is stored; and
a recording control unit which records a captured video output from the video output unit of the interface device in the storage unit based on the condition matching information or the identification information.

5. The video output system according to claim 2, further comprising
a display device,
wherein the display device comprises:
a display unit on which a video is displayed; and
a display control unit which displays a captured video output from the video output unit of the interface device on the display unit based on the condition matching information or the identification information.

6. The video output system according to claim 1, further comprising
a user input device through which a user inputs the conditions,
wherein the conditions input through the user input device are stored in the condition storage unit of the interface device.

7. The video output system according to claim 2, further comprising
a database device comprising a database storage unit,
wherein the video output unit outputs the identification information to the database device, and
recording control information including information on a frame meeting the conditions in the captured video and information on the conditions is recorded in the database storage unit, based on the condition matching information and the identification information.

8. The video output system according to claim 1, further comprising
a sensor device,
wherein the sensor device comprises:
a sensor unit which acquires surrounding information;
a sensor device condition acquisition unit which acquires the conditions from the interface device; and
a sensor additional information generation unit which determines whether or not the surrounding information acquired by the sensor unit meets the conditions to generate an auxiliary recognition signal indicating whether or not the surrounding information meets the conditions and outputs the auxiliary recognition signal to the interface device,
the interface device further comprises an auxiliary recognition signal transfer unit which transmits the auxiliary recognition signal output from the sensor device to the camera, and
the sensor additional information generation unit of the camera determines whether or not a captured video generated by the video generation unit based on the auxiliary recognition signal meets the conditions.

9. The video output system according to claim 3, further comprising
a recording device,
wherein the recording device comprises:
a storage unit in which a video is stored; and
a recording control unit which records a captured video output from the video output unit of the interface device in the storage unit based on the condition matching information or the identification information.

10. The video output system according to claim 3, further comprising
a display device,
wherein the display device comprises:
a display unit on which a video is displayed; and
a display control unit which displays a captured video output from the video output unit of the interface device on the display unit based on the condition matching information or the identification information.

* * * * *